(12) United States Patent
Rotman

(10) Patent No.: US 7,090,347 B1
(45) Date of Patent: Aug. 15, 2006

(54) SCREW-LESS HINGE STRUCTURE FOR SPECTACLES

(75) Inventor: Tracey Ellen Rotman, Randolph, VT (US)

(73) Assignee: Tracey Ellen Rotman, Randolph, VT (US)

( * ) Notice: Subject to any disclaimer, the term of this patent is extended or adjusted under 35 U.S.C. 154(b) by 0 days.

(21) Appl. No.: 11/132,572

(22) Filed: May 19, 2005

Related U.S. Application Data

(60) Provisional application No. 60/665,975, filed on Mar. 29, 2005.

(51) Int. Cl.
    *G02C 5/22*       (2006.01)

(52) U.S. Cl. ......................................... 351/153; 16/228
(58) Field of Classification Search ................ 351/153; 16/228

See application file for complete search history.

(56) References Cited

U.S. PATENT DOCUMENTS 5,684,559 A * 11/1997 Lin ............................. 351/110

\* cited by examiner

*Primary Examiner*—Huy Mai

(57) ABSTRACT

An improved screw-less hinge structure for assembling spectacles, particularly for, but not by way of limitation to, children's sunglasses, each comprising a spectacle frame (20) containing a finger-shaped fitting member (22) with a disc-shaped fitting void (24) affixed to one end of the frame (20), mating with a respective arm (26) having a coupling member (28) comprised of a finger-shaped upper segment (28A) with an upper disc-shaped void (30A) that is vertically aligned with a finger-shaped lower segment (28B) with a lower disc-shaped void (30B) affixed to one end of the arm (26), and a loop-like fastener (32) with a self-locking manner that reduces the risk of the loss of crucial parts. The predetermined positions of the fitting void (24), upper void (30A), and lower void (30B) vertically align to create a shaft (40) necessary to house the fastener (32) securely. The assembled hinge structure (FIG. 6) permits the arm (26) to attain a degree of flexibility beyond its normal use position along the horizontal axis (FIG. 9) and vertical axis (FIG. 8) in relation to the frame (20), resting against the outer edge of the frame (20) acting as a stop, allowing the spectacles to maintain its wearable formation.

20 Claims, 6 Drawing Sheets

SCREW-LESS HINGE STRUCTURE FOR SPECTACLES

CROSS-REFERENCE TO RELATED APPLICATIONS

This application claims the benefit of Provisional Patent Application Ser. No. 60/665,975, filed 2005, Mar. 29 by the present inventor.

FEDERALLY SPONSORED RESEARCH not applicable

SEQUENCE LISTING not applicable

BACKGROUND

1. Field of Invention

The present invention relates to a screw-less hinge structure for spectacles, particularly for, but not by way of limitation to, children's sunglasses.

2. Prior Art

Over the years, eyewear assembly has taken on many sizes and forms in order to satisfy a variety of needs. Whether as sunglasses or spectacles, the traditional assembly consists of a spectacle frame for holding at least one lens, arms that extend out and over the ears of the individual, and a hinge structure, including a fastener, for attaching the arms to the spectacle frame in an interlocking manner. The type of hinge structure significantly helps to determine the allowance of movement of each arm from a collapsed or closed position in relation to the spectacle frame to an in-use, wearable or normal use position. In time, this structure has been continually modified for a number of reasons including the desire to improve the way in which an individual arm is secured to its spectacle frame.

The conventional hinge structure shown in FIG. 1 utilizes a very small bolt or screw 18 that fastens a front frame 20 with a finger-shaped fitting member 22 perpendicularly affixed to the outer end of frame 20, to a corresponding temple, stem or arm 26 with a mating coupling member 28, comprising a finger-shaped upper portion or segment 28A vertically aligned with a finger-shaped lower portion or segment 28B. This interlocking approach of connecting portions has numerous disadvantages including a tendency for screw 18 to loosen as a result of a frequent opening and closing action for use or storage of spectacles. Accordingly, it becomes necessary to tighten screw 18 often with a specialized miniature screwdriver. If the user does not have this type of tool on hand and attempts to tighten screw 18 with another type of instrument, such as a knife blade or similar sharp object, screw 18 eventually will be rendered useless from improper handling, leaving deformed grooves upon the top of screw 18, thus rendering the screw non-adjustable, resulting in the user's inability to firmly secure arm 26 to frame 20. Needless to say, this is not a circumstance of great safety for young children.

Through repeated pivotal movements of arm 26 to frame 20 of the conventional hinge structure in FIG. 1, screw 18 will eventually rotate out of the merged unit of fitting member 22 and coupling member 28, leaving frame 20 unstable and prone to separation from arm 26. In such cases where screw 18 is inadvertently lost, unless the user has an exact replacement for screw 18, the spectacles become virtually useless or at least very difficult to manage until the proper replacement piece is found. In the case of young children, missing screw 18 is small enough to be swallowed, choked on, poked into the eye or inserted into the nostril or ear.

A third example of the problems faced with the conventional hinge structure shown in FIG. 1 relates to the excessive pressure absorbed by arm 26 when the spectacle's structure is not a perfect fit to the user or when the characteristic curiosity of young children leads to excessive twists and pulls upon the spectacle's structure. If arm 26, traditionally made of metal or hard plastic, lacks the needed flexibility to provide a suitable fitting to one's face, it will need to be manually bent by the user. Otherwise, the mounting pressure will create enough tension that no other outcome than the structure's inevitable breaking will result. Also, as the excessive twists and pulls upon the spectacle's structure by a young child creates substantial tension, the resulting broken eyewear with sharp edges, such as arm 26 or frame 20, will cause injury whether attached to or free from its main structure.

There are various patents that address the above-mentioned drawbacks but significant problems remain with each.

Several methods that attempt to solve the problematic nature of the conventional hinge structure in FIG. 1 in its relationship to the flexibility of arms beyond a normal use position can be viewed in U.S. Pat. No. 6,530,660 to Chao et al. (2003), U.S. Pat. No. 6,027,215 to Hsu (2000), and U.S. Pat. No. 4,832,479 to Beyer et al. (1989). However, each of these structures continues to utilize a minute screw in some capacity in order fasten an arm to the frame. The use of a very small screw in a hinge structure leads to potential loss, high cost and time consuming production.

U.S. Pat. No. 5,659,017 to Bennato (1991) addresses the need for an improved spectacle hinge structure by using a screw-less device, however a problem with this composition is within the design of the hinge structure as an interchangeable or removable hinge system. Specifically, the pulls, bends, and twist that are applied to this type of mechanism by a very young child allows for the popping out or detachment of a small fastening component creating the possibility of a lost crucial element, leaving a deformed spectacle structure.

While U.S. Pat. No. 5,268,710 to Anstey (1993) attempts to remove the danger of structural breakage by using a system of bands for the frame members and arms, there remains an aesthetic disadvantage to this design. Anstey's structure does not fulfill a young child's natural desire to emulate older children and adults via wearing the same type of or typical spectacle structure. For that reason, an assembly for spectacles modeled after the ones worn by older children and adults as well as ones that provide a more child-friendly nature in furthering the degree of flexibility is still necessary.

While U.S. Pat. No. 4,017,165 to Davis (1977) addresses the need for increased flexibility, there are disadvantages to be found within the structure itself First, the form of the fastener is not sturdy enough to prevent its displacement as the spectacle is used. Clearly this lacks the degree of safety desired when the spectacle is in the hands of a young child. Also, the limited range of motion along the longitudinal axis of this spectacle structure represents a configuration in which the earpiece will separate from or snap off of the frame when excess longitudinal pressure is applied. Therefore, Davis's attempt still leaves the need to overcome the important risks of missing parts, or parts that easily can be subject to ingestion, choking, poking or insertion.

Although various developments have been applied to the structure of both the spectacle and the hinge, a number of drawbacks are still recognizable, demonstrating the necessity for using a screw-less hinge structure in order to prevent the drawbacks listed above.

BACKGROUND

Objects and Advantages

Accordingly, several objects and advantages of my screw-less hinge structure are to provide an improved spectacle assembly utilizing a screw-less hinge, to provide a screw-less hinge structure containing a small number of components, to provide a means of increasing flexibility beyond a normal use position both horizontally and vertically, to provide a safer, more durable child-friendly spectacle structure, and to provide a spectacle assembly that can be manufactured easily and at a low cost while reducing the risk of the loss of crucial parts.

Further objects and advantages of my screw-less hinge structure will become apparent from a study of the following detailed description of the preferred embodiment and accompanying drawings.

SUMMARY

The aim of my screw-less hinge structure invention is to eliminate the disadvantages described above by providing an improved hinge system that easily and securely assembles a spectacle structure. The screw-less hinge structure connects a front frame to a pair of respective temples by means of a loop-like fastener with a self-locking manner. This configuration allows the user to maintain the durable structure of the spectacles while providing for the above-mentioned objects and advantages including the increased degree of flexibility beyond a normal use position both horizontally and vertically, and reduced risk of the loss of crucial parts.

DRAWINGS

DRAWINGS

Reference Numerals

| | |
|---|---|
| 18 | screw of conventional hinge structure |
| 20 | spectacle's frame |
| 22 | spectacle's frame fitting member |
| 24 | spectacle's frame fitting member void |
| 26 | spectacle's arm |
| 28 | spectacle's arm coupling member |
| 28A | spectacle's arm upper coupling member segment |
| 28B | spectacle's arm lower coupling member segment |
| 30A | spectacle's arm upper coupling member segment void |
| 30B | spectacle's arm lower coupling member segment void |
| 32 | spectacle's fastener |
| 34 | spectacle's inside diameter of fastener |
| 36 | spectacle's outside diameter of fastener |
| 38 | spectacle's wire diameter of fastener |
| 40 | spectacle's shaft |

DETAILED DESCRIPTION

Preferred Embodiment

Figure 1:
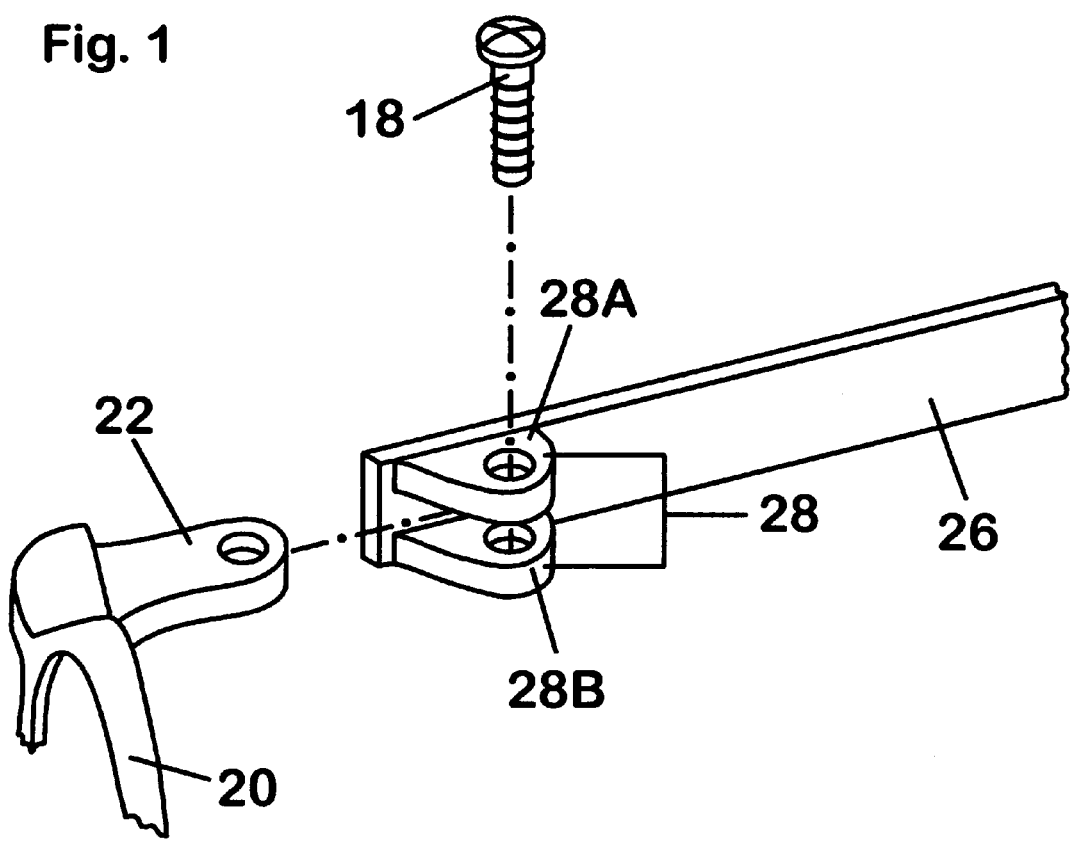
FIG. 1 is an exploded view of the inner right side of the assembly of the traditional spectacle utilizing a conventional screw hinge structure, showing its connecting portions.
Figure 2:
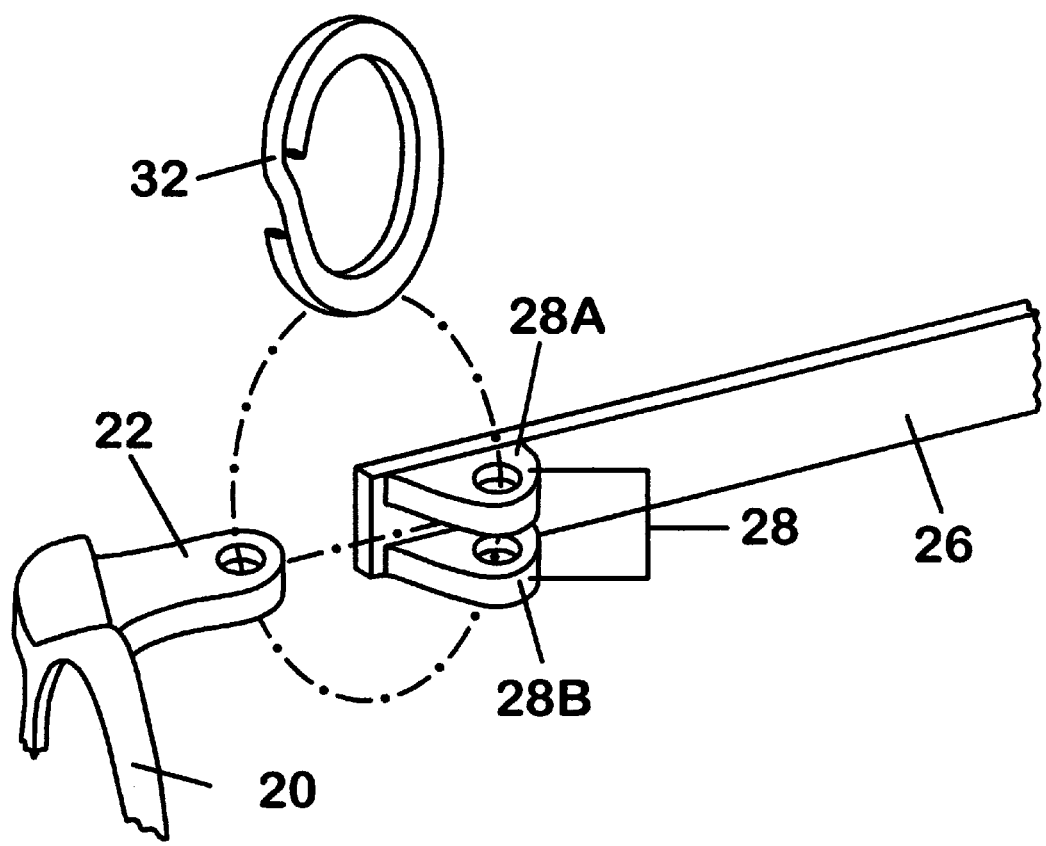
FIG. 2 is an exploded view of the inner right side of the assembly of the present invention, showing the connecting portions of the screw-less hinge structure for spectacles.
Figure 5:
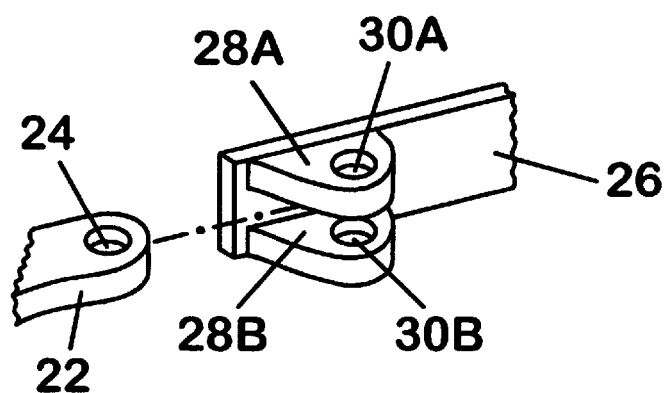
FIG. 5 is a segmented view of the spectacle frame and arm in its unassembled form highlighting the disc-shaped voids within the fitting member of the spectacle frame and the coupling member of the arm, as indicated in FIG. 2.

The present invention of a screw-less hinge structure for assembling spectacles consists of a significant improvement over the conventional hinge structure shown in FIG. 1. An exploded view of the assembly of connecting portions for the screw-less hinge structure is shown in FIG. 2. Because the unions on the left and right sides are equivalent, the assembly of only the right side of the spectacle will be set forth in detail herein. The diagram illustrates frame 20, which includes fitting member 22 affixed to one end of frame 20 that merges with mating coupling member 28, comprising upper segment 28A vertically aligned with lower segment 28B, affixed to one end of corresponding arm 26. As FIG. 5 shows, fitting member 22, upper segment 28A, and lower segment 28B each has a horizontally rounded or disc-shaped opening or void, specifically a fitting member void 24, an upper segment void 30A, and a lower segment void 30B, which lay flat and equally spaced upon each element.

Figure 3:
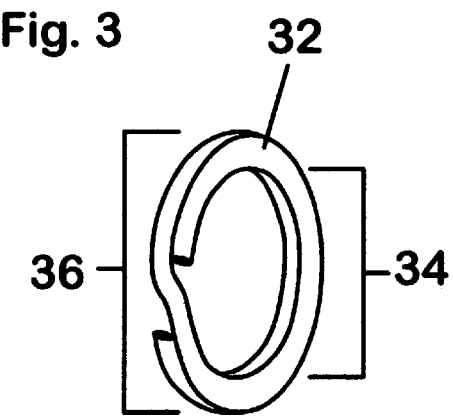
FIG. 3 is an enlarged view of the screw-less fastener for the screw-less hinge structure, as indicated in FIG. 2.
Figure 4:
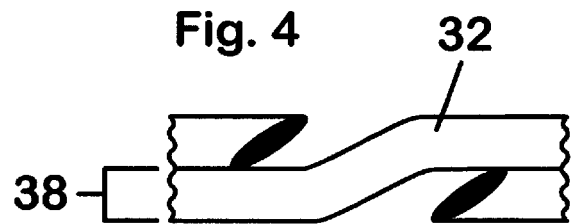
FIG. 4 is an enlarged cross section and side view of the screw-less fastener, as indicated in FIG. 3.

A screw-less component, linking feature or fastener 32, shown in FIG. 3, is preferably a single wire made of a sturdy, non-rusting material such as stainless steel that is curved into a ring, circular or loop-like formation of double thickness for nearly its entire circumference. Fastener 32 is preferably a split ring whose ends characteristically face each other while resting parallel along opposite sides of the wrapped-around wire. Made at a fine gauge, Fastener 32 is comprised of an outside diameter 36 measuring approximately 0.334 inches or 8.48 mm. and an inside diameter 34 measuring approximately 0.264 inches or 6.71 mm. Fastener 32, shown in FIG. 4, preferably has a wire diameter 38 of approximately 0.032 inches. In all, fastener 32 has a thickness less than that of the diameter of a tube or shaft 40, represented in FIG. 7, which is created by the vertical alignment fitting member 22 and coupling member 28.

Figure 6:
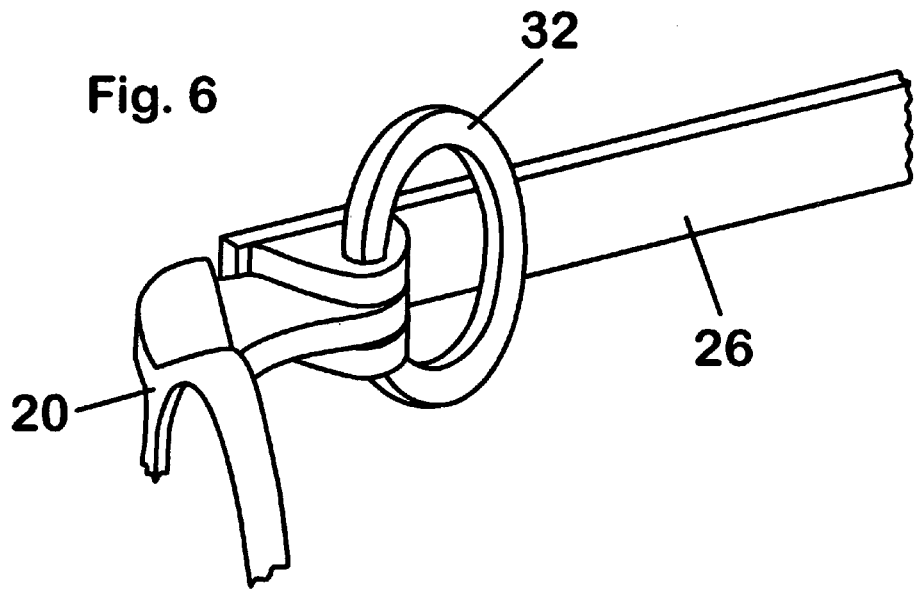
FIG. 6 is a perspective view of the screw-less hinge structure in its assembled form, as indicated in FIG. 2.

Arm 26 and frame 20 are preferably constructed of, but not limited to, a suitable soft and flexible material such as rubber, e.g. DuPont Rubber. The inherent flexible characteristics of the rubber material from which arm 26 and frame 20 are constructed facilitate the relationship between fastener 32 with arm 26 and frame 20 via shaft 40. An assembled form of the present invention can be viewed in FIG. 6.

While the preferred embodiment of my screw-less hinge structure has been shown and described, it should not be deemed a limitation to its form for it is to be understood and recognized that various modifications may be made accordingly without departing from the spirit and scope of the invention as claimed.

Operation of invention:

In operation, one uses the spectacles in a normal manner with frame 20 covering the eyes and arm 26 having sufficient length to extend across the side of the user's face to the respective ear and then fit the curvature of the user's ear to support the spectacles in a fixed position on the user's head.

The material of frame 20 and arms 26 are of a pliable nature. This provides for a higher degree of flexibility, which makes the spectacle structure safer for young children. The flexible characteristic of the rubber material from which arm 26 and frame 20 are constructed also increases durability and results in lesser weight and cost in comparison to other materials. With the use of a flexible material, there is a lesser danger of injury from sharp edges or small parts breaking free. Accordingly, the level of flexibility of the spectacles as a whole unit increases because the pliable nature of the material used for frame 20 and arm 26 enables the individual pieces to bend, which in conjunction with the forgiving but secure nature of fastener 32 furthers the advantages of the degree of newly found flexibility in multiple directions permitting resilience beyond a normal use position.

Fastener 32 is a single wire made of a sturdy, non-rusting material such as stainless steel. The strength of this material helps to provide a sturdy elemental presence in a significantly flexible environment, while the protection from oxidation allows the user to minimize concern with regard to spectacle use and exposure to the elements of nature.

Figure 7:
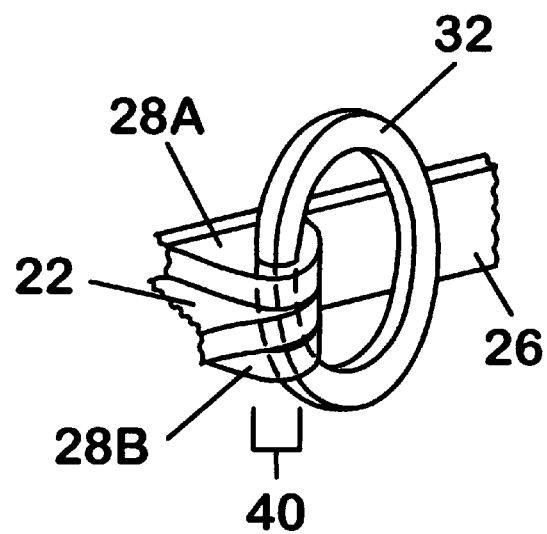
FIG. 7 is a transparent view of the screw-less hinge structure in its assembled form, as indicated in FIG. 6.

As illustrated in FIG. 7, when fitting member 22 and coupling member 28, comprising upper segment 28A and lower segment 28B, are mated, their vertical configuration allows for fitting void 24, upper void 30A, and lower void 30B to equally align, creating shaft 40 to engage or house fastener 32. An exploded view showing greater detail of fitting void 24, upper void 30A, and lower void 30B can be seen in FIG. 5. Fastener 32 is then threaded through shaft 40 and rotated until the point that both ends of fastener 32 are positioned to rest within shaft 40, thus linking frame 20 with arm 26. This presents a smooth, exposed portion of fastener 32, leaving no sharp edges to scratch skin or surfaces, or snag clothing.

Fastener 32 has a self-locking configuration by which its ends face each other while resting parallel along opposite sides of the wrapped-around wire. As illustrated in FIG. 3, preferred inside diameter 34 and outside diameter 36, along with wire diameter 38, shown in FIG. 4, embody the necessary dimensions for fastener 32 to securely fit within shaft 40, which bears a slightly larger diameter. This self-locking system reduces the risk of loss of crucial parts, thereby increasing the secure nature in which arm 26 unites with frame 20.

Figure 8:
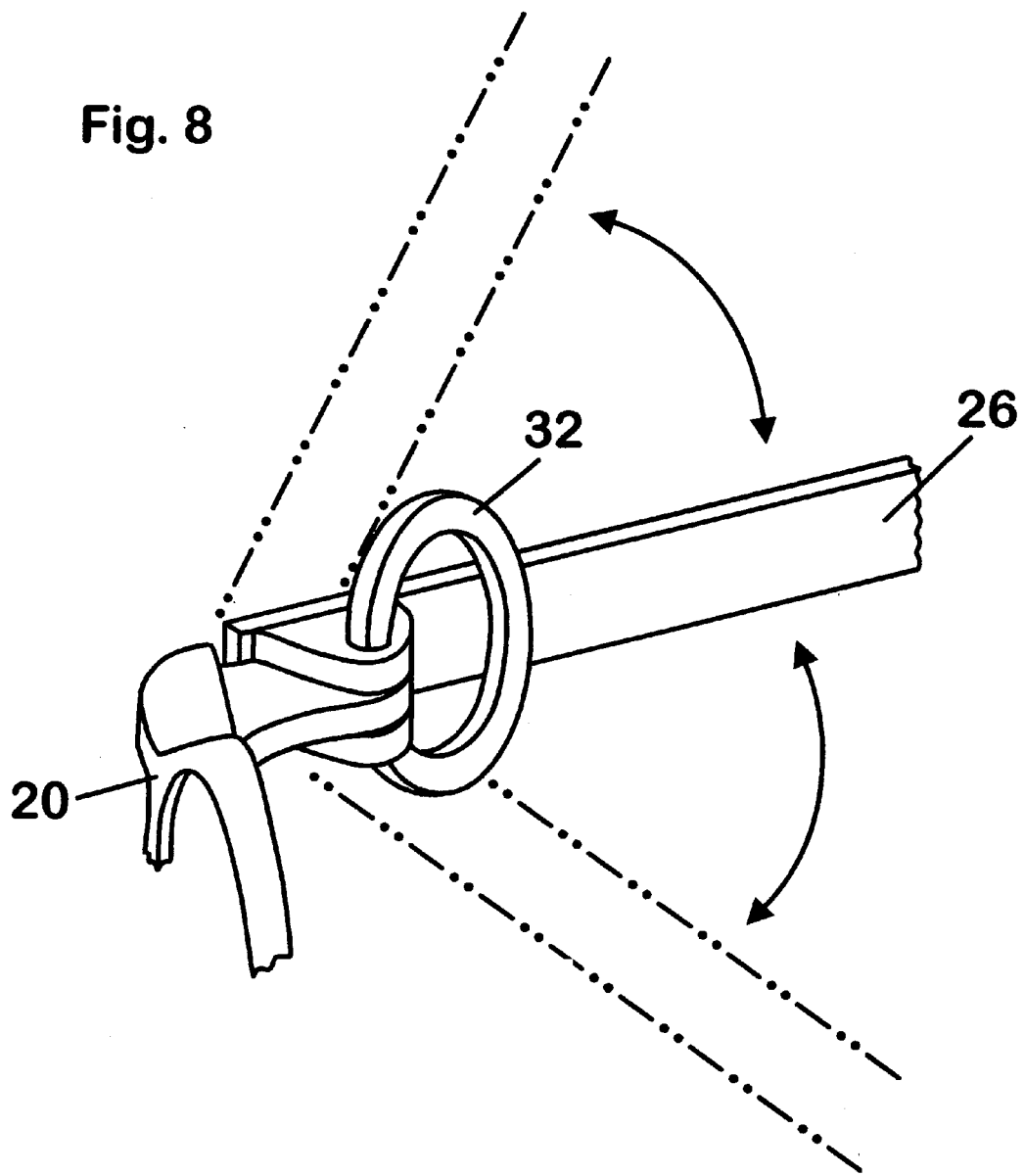
FIG. 8 is a perspective view of the present invention, as indicated in FIG. 6, showing in detail its flexibility beyond a normal use position on a vertical or longitudinal plane.

As seen in FIG. 8, fastener 32 provides for a broader amount of function between arm 26 and frame 20 making it possible for arm 26 to have an extended vertical range of motion, shown in phantom, by moving along the contour of fastener 32 on a longitudinal axis via shaft 40. When manual pressure is applied to arm 26, the curvature of fastener 32 allows for arm 26 to be swung from a normal use position with respect to frame 20 perpendicularly to the plane above and below frame 20 to provide the flexibility upward and downward beyond a normal use position for arm 26. As arm 26 is moved vertically beyond its normal use position, it rests against the outer edge of frame 20, thus acting as a built-in flexible stopper preventing arm 26 from swinging upward or downward at inappropriate times, such as when the user is wearing the spectacles, yet maintaining its wearable formation upon faces of various sizes and shapes. The preferred bendable material of arm 26 and frame 20 also permits for the extra flexibility in this type of swinging motion.

Figure 9:
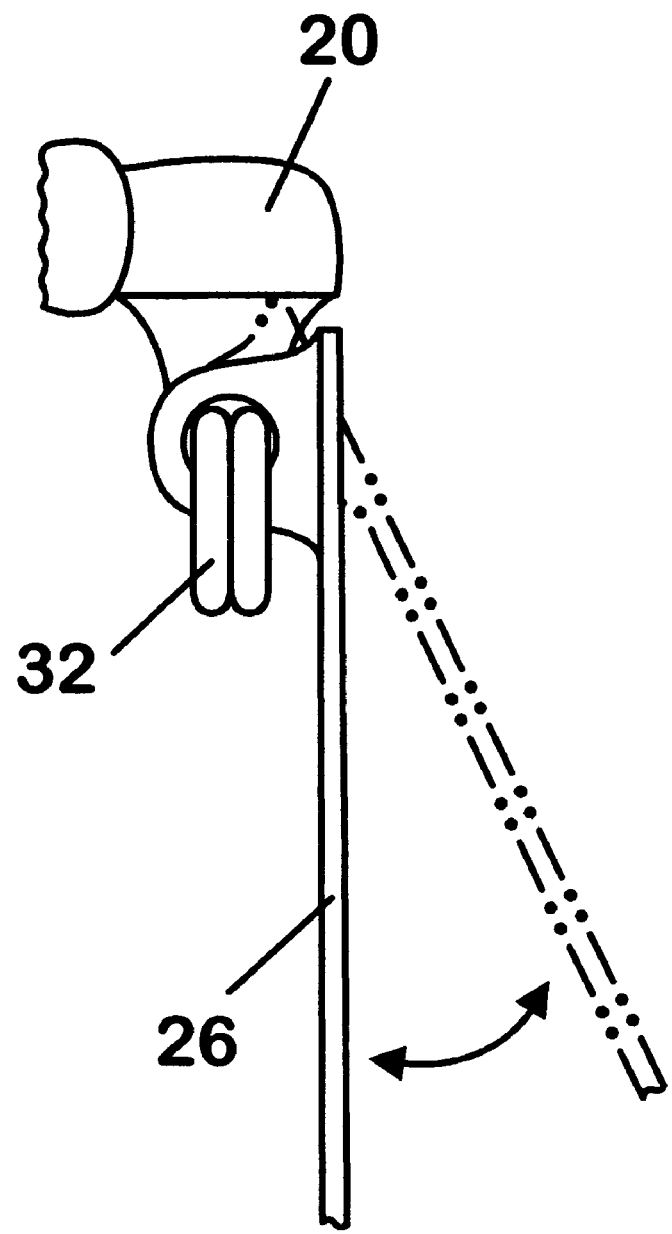
FIG. 9 is a perspective top view of the present invention, as indicated in FIG. 6, showing in detail its flexibility beyond a normal use position on a horizontal or latitudinal plane.

FIG. 9 represents the spectacle's range of flexibility on a horizontal plane where, shown in phantom, arm 26 maintains its desired motion inward towards a closing position against the backside of frame 20 while the loop-like shape of fastener 32 provides a swinging motion on which arm 26 extends beyond a normal use position outward along a latitudinal axis via shaft 40. When manual pressure is applied to arm 26, the curvature of fastener 32 allows for arm 26 to be moved back and forth with respect to frame 20 horizontally inward and outward from the plane of frame 20 to provide the normal and extension beyond a normal use position for arm 26. As arm 26 is moved outward beyond its normal use position, it rests against the outer edge of frame 20, which acts as a built-in flexible stopper preventing arm 26 from swinging outward at inappropriate times, such as when the user is wearing the spectacles, yet maintaining its wearable formation upon faces of various sizes and shapes.

The assembly of spectacles utilizing fastener 32 versus screw 18 from the conventional hinge structure, shown in FIG. 1, alleviates concern to the user that, from frequent opening and closing actions, screw 18 will loosen from or rotate out of merged fitting member 22 and connecting member 28, weakening the connection of frame 20 to arm 26 or becoming lost. In using fastener 32 instead of screw 18, the rigidity of the conventional hinge structure decreases, as the shape and material of fastener 32 allows, for example, curious young children to explore the spectacle structure through excessive twists, turns and pulls.

Therefore a number of results are achieved with the inclusion of this type of screw-less hinge structure:

(1) The use of fastener 32 provides a hinge structure with a small number of components, as fastener 32 is made up of a single element.
(2) The flexibility with regard to the relationship between frame 20 and arm 26 increases due to the loop-like formation of fastener 32, so that arm 26 can reach a range of motion beyond a normal use position both horizontally and vertically.
(3) A more durable, child-friendly spectacle structure is achieved as the material used for frame 20 and arm 26 is more pliable and fastener 32 securely fits within shaft 40 as a result of its self-locking system.
(4) It is possible to manufacture the present invention easily at a low cost as the spectacles do not require the high working precision of placing a minute screw into a similarly miniscule shaft using specialized tools, but instead fastener 32 is threaded and locked into a secured position in a screw-less hinge structure in one motion of a single element. No loosening or loss of a minute screw is possible with this design, which reduces the risk of the loss of crucial parts.

CONCLUSION, RAMIFICATIONS AND SCOPE OF INVENTION

Thus, the reader will see that spectacles assembled with a specialized screw-less hinge structure allows for a highly reliable, flexible, and economical device that can be used safely by users of any age, including young children. In particular, the assembly of the spectacles:
- offers a non-conventional, screw-less hinge structure that is comprised of a small number of parts;
- a allows for improved flexibility, extending the range of motion for both the spectacle frame and each arm beyond a normal use position both horizontally and vertically;
- makes available safer, more durable eyewear for users of all ages as a result of the materials of the components, and the relationship between the components; and
- provides an assembly that can be achieved in a simple, concise and cost effective manner while reducing the risk of the loss of crucial parts.

While the above description contains many details, these should not be construed as limitations on the scope of my screw-less hinge structure, but rather as an example of its preferred embodiment. Many other variations are possible. For example, the fastener can be made in a range of weight, size, and thickness; the fastener can be created from a material such as zinc, nickel, copper-plated steel, brass, etc, with the option of applying a specialized coating so as to protect the fastener against oxidation; the fastener can be of a variety of connecting elements, such as, key rings, gift rings, jump rings, etc.; the fastener can be of another color; the spectacle frame and respective arms can be made from materials such as plastic, metal, etc.; the spectacle frame and respective arms can be produced in a variety of colors, shapes, and sizes to best suit the aesthetics taste of the user; the number of fitting members and coupling members with their respective voids can be increased or decreased; the eyewear can be prescription, non-prescription, fashion accessory, novelty, etc.; the eyewear can be for a variety of ages.

Accordingly, the scope of my screw-less hinge structure should be determined not by the embodiment illustrated, but by the appended claims and their legal equivalents.

What is claimed is:

1. A screw-less hinge structure for assembling spectacles each comprising:
   (a) a fitting member extending outwardly from the outer end of a spectacle frame and including a predetermined number of voids, and
   (b) a coupling member extending outwardly from one end of an arm and including a predetermined number of voids, and
   (c) a shaft forming from the union of respective said voids located on said fitting member and said coupling member and having means to house a loop-like fastener securely, and
   (d) said loop-like fastener with a first means for linking said loop-like fastener to said spectacle frame and said arm via said shaft which accordingly allows for a second means of increasing flexibility whereby said arm in relation to said spectacle frame can move from a wearable position to beyond a normal use position both horizontally and vertically when said loop-like fastener is engaged with said shaft thereby accommodating for excessive twists and pulls upon said spectacles.

2. The spectacle structure of claim 1 wherein said spectacles are sunglasses.

3. The spectacle structure of claim 2 wherein said sunglasses are of sufficient size to accommodate use by young children.

4. The spectacle structure of claim 1 wherein said spectacle frame is made of flexible rubber material allowing for a degree of flexibility within the elemental structure of said spectacle frame.

5. The spectacle structure of claim 1 wherein said arm is made of flexible rubber material allowing for a high degree of flexibility within the elemental structure of said arm.

6. The spectacle structure of claim 1 wherein said fitting member extending outwardly from said spectacle frame is a finger-shaped form.

7. The spectacle structure of claim 6 wherein said finger-shaped form is affixed substantially perpendicular to said spectacle frame.

8. The spectacle structure of claim 1 wherein said coupling member extending outwardly from said arm is comprised of an upper segment and a lower segment.

9. The spectacle structure of claim 8 wherein said upper and lower segments are each finger-shaped forms.

10. The spectacle structure of claim 9 wherein said finger-shaped forms are affixed substantially perpendicular to one end of said arm.

11. The spectacle structure of claim 10 wherein said affixed forms are vertically aligned.

12. The spectacle structure of claim 1 wherein said voids located upon said fitting member and said coupling member are disc-shaped.

13. The spectacle structure of claim 12 wherein said disc-shapes have predetermined positions upon said fitting member and said coupling member.

14. The spectacle structure of claim 13 wherein said predetermined positions are vertically aligned.

15. The spectacle structure of claim 1 wherein said shaft having means to house said loop-like fastener to said fitting member and said connecting member comprises a cylindrical shape.

16. The spectacle structure of claim 15 wherein said cylindrical shape has a substantially complimentary form to said loop-like fastener allowing for an interconnecting fit between said loop-like fastener and said shaft.

17. The spectacle structure of claim 1 wherein said loop-like fastener is made of a predetermined size and thickness of a single curved wire of stainless steel with a self-locking feature by which the ends face each other while resting parallel along opposite sides of said curved wire.

18. The spectacle structure of claim 1 wherein said first means to link said loop-like fastener to said spectacle frame and said arm via said shaft creates a significantly secure connection between said spectacle frame and said arm through said shaft.

19. The spectacle structure of claim 18 wherein said first means allows for said second means for providing increased flexibility including range of movement of said arm about a horizontal axis with respect to said spectacle frame extending from a closed position outwardly to greater than a 90 degree angle to rest against the outer edge of said spectacle frame as a stop.

20. The spectacle structure of claim 18 wherein said first means allows for said second means for providing increased flexibility including range of movement of said arm about a vertical axis with respect to said spectacle frame extending from a normal use position upwardly and downwardly to greater than a 45 degree angle in either direction to rest against the outer edge of said spectacle frame as a stop.

* * * * *